US008505706B2

(12) United States Patent
Horling et al.

(10) Patent No.: US 8,505,706 B2
(45) Date of Patent: *Aug. 13, 2013

(54) BEARING ARRANGEMENT FOR A LOAD-BEARING ROLLER

(75) Inventors: Peter Horling, Schonungen-Mainberg (DE); Edgar Pickel, Sommerach (DE)

(73) Assignee: Aktiebolaget SKF, Goteborg (SE)

( * ) Notice: Subject to any disclaimer, the term of this patent is extended or adjusted under 35 U.S.C. 154(b) by 301 days.

This patent is subject to a terminal disclaimer.

(21) Appl. No.: 12/920,372

(22) PCT Filed: Mar. 6, 2009

(86) PCT No.: PCT/EP2009/001630
§ 371 (c)(1), (2), (4) Date: Dec. 22, 2010

(87) PCT Pub. No.: WO2009/109399
PCT Pub. Date: Sep. 11, 2009

(65) Prior Publication Data
US 2011/0114439 A1    May 19, 2011

(30) Foreign Application Priority Data

Mar. 7, 2008 (DE) .......................... 10 2008 013 131

(51) Int. Cl.
*B65G 13/00* (2006.01)
(52) U.S. Cl.
USPC ............................................................ 193/37
(58) Field of Classification Search
USPC .................... 193/37; 198/788, 789
See application file for complete search history.

(56) References Cited

U.S. PATENT DOCUMENTS

| 2,034,534 | A |   | 3/1936  | Pitner |
|-----------|---|---|---------|--------|
| 2,312,615 | A |   | 3/1943  | Allen |
| 3,395,953 | A |   | 8/1968  | Pitner |
| 3,610,387 | A | * | 10/1971 | Vom Stein ...................... 193/37 |
| 3,793,689 | A | * | 2/1974  | Specth ............................ 193/37 |
| 3,957,147 | A | * | 5/1976  | Specht ............................ 193/37 |
| 4,267,920 | A |   | 5/1981  | Olschewski et al. |
| 4,315,566 | A | * | 2/1982  | Greener et al. ................. 193/37 |
| 4,339,158 | A | * | 7/1982  | Greener et al. ............... 384/489 |
| 4,793,459 | A |   | 12/1988 | Forknall et al. |
| 4,852,230 | A | * | 8/1989  | Yu ............................. 29/898.07 |
| 5,722,888 | A | * | 3/1998  | Lane ............................ 460/114 |

(Continued)

FOREIGN PATENT DOCUMENTS

CH         696354 A5    5/2007
DE        1738837 U     1/1957

(Continued)

*Primary Examiner* — Gene Crawford
*Assistant Examiner* — Keith R Campbell
(74) *Attorney, Agent, or Firm* — Bryan Peckjian; SKF USA Inc. Patent Department

(57) ABSTRACT

A bearing assembly is configured to be axially mountable in a support roller as a single structural unit. The support roller includes an at least partially hollow-cylindrical support roller shell and a support roller shaft. The bearing assembly comprises a mounting element configured to axially slide on the support roller shaft for mounting the bearing assembly in the support roller, a roller bearing having an inner ring fixedly supported on the mounting element, a support body radially surrounding the roller bearing, a cushioning layer radially surrounding the support body, and a sleeve radially surrounding the cushioning layer. The sleeve is configured to slidably contact an inner cylindrical surface of the support roller shell.

20 Claims, 1 Drawing Sheet

(56) References Cited

U.S. PATENT DOCUMENTS

| | | | |
|---|---|---|---|
| 5,865,290 A * | 2/1999 | Scott | 193/37 |
| 6,547,054 B2 * | 4/2003 | Gamache | 193/37 |
| 6,782,996 B1 * | 8/2004 | Wolf | 198/781.02 |
| 7,028,825 B2 * | 4/2006 | Scott | 193/37 |
| 8,172,065 B2 * | 5/2012 | Kamm et al. | 193/37 |
| 2003/0034222 A1 * | 2/2003 | Gamache | 193/35 TE |
| 2005/0217967 A1 * | 10/2005 | Scott | 193/37 |
| 2007/0261933 A1 * | 11/2007 | Scott | 193/37 |
| 2011/0002571 A1 * | 1/2011 | Horling et al. | 384/569 |
| 2011/0038577 A1 * | 2/2011 | Horling et al. | 384/563 |
| 2012/0045156 A1 * | 2/2012 | Pickel et al. | 384/489 |

FOREIGN PATENT DOCUMENTS

| | | |
|---|---|---|
| DE | 1756818 A1 | 4/1970 |
| DE | 7819856 U1 | 10/1978 |
| DE | 2801879 A1 | 11/1978 |
| DE | 2629436 C2 | 6/1979 |
| DE | 3004405 A1 | 8/1981 |
| DE | 3536327 A1 | 4/1986 |
| GB | 1558933 A | 1/1980 |
| GB | 2038450 A | 7/1980 |
| GB | 1589904 A | 5/1981 |
| GB | 2070196 A | 9/1981 |
| GB | 2175965 A | 12/1986 |
| SU | 846885 A1 | 7/1981 |

\* cited by examiner

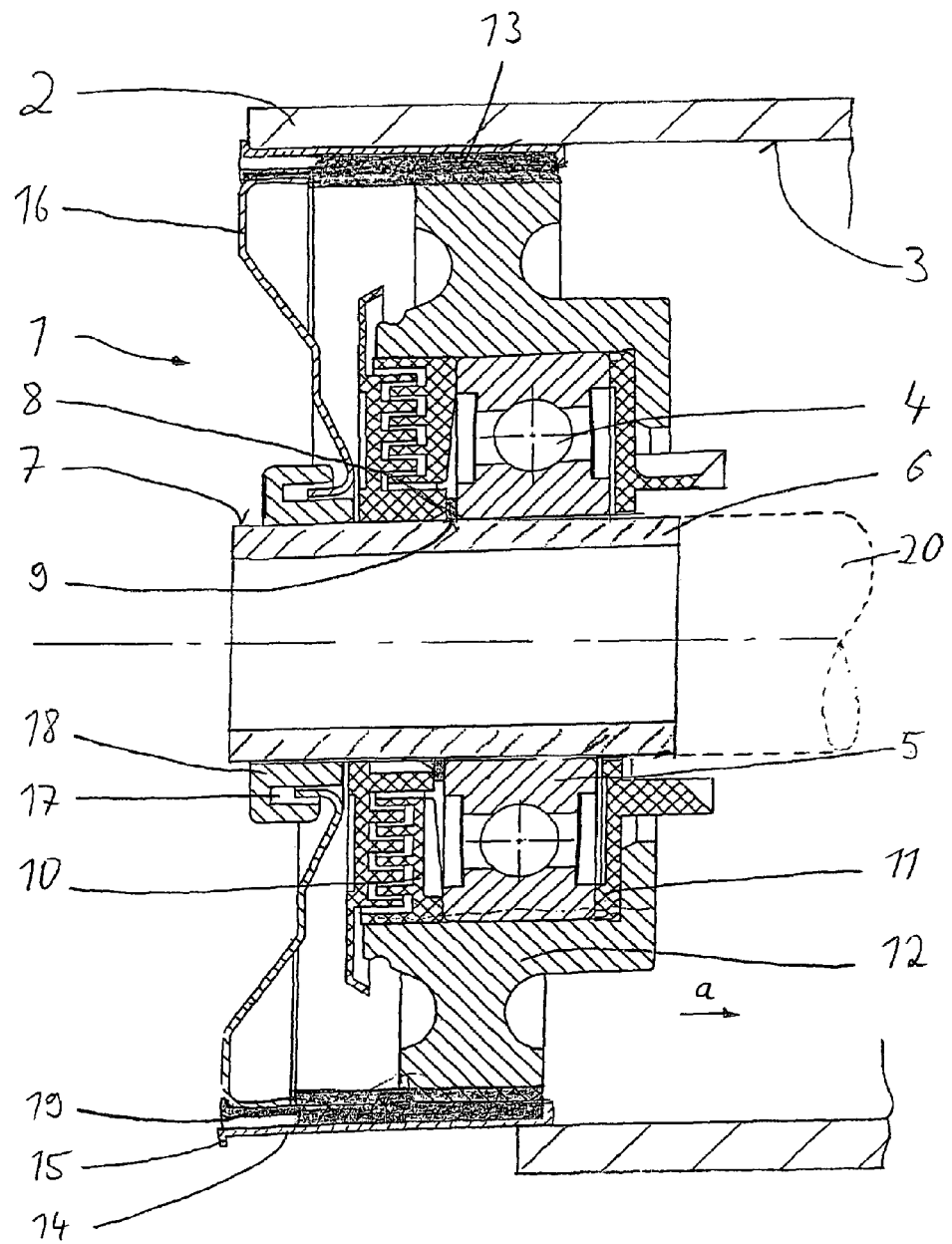

BEARING ARRANGEMENT FOR A LOAD-BEARING ROLLER

CROSS-REFERENCE

This application is the U.S. national stage of International Application No. PCT/EP2009/001630 filed on Mar. 6, 2009, which claims priority to German patent application no. 10 2008 013 131.8 filed on Mar. 7, 2008.

The invention generally relates to a bearing assembly suitable for rotatably supporting a support roller having a support roller shell.

RELATED ART

Diverse possibilities are known in the prior art for the bearing of support rollers. In most cases, a well-cushioned bearing of the support roller is desired, so that the bearing assembly can be provided with a layer of cushioning material between the support roller shell and the bearing, which is embodied, in most cases, as a roller bearing. DE 1 738 837 U discloses a conventional bearing assembly. DE 28 01 879 A 1 discloses a similar bearing assembly, wherein the bearing supports a sleeve via an elastic intermediate layer. The sleeve radially widens in one axial end portion and its radial outer portion is welded to the cylindrical inner surface of the support roller shell.

In previously known solutions, the following is disadvantageous: the support rollers are subjected to a significant load during operation, so that they are capable of operating only for a certain service life. Then they must be replaced. In most cases, the entire support assembly including the bearing is replaced. This takes place, in particular, because a bearing replacement, in most cases under difficult surrounding conditions, would be costly, if it concerns, for instance, a bearing of a longer conveyer belt for bulk materials.

The replacement of a bearing under such circumstances would be time-consuming and therefore costly. In addition, the recyclability of the support roller assembly and, if necessary, its repair were previously difficult or not possible.

Accordingly, in one aspect of the present teachings, a bearing assembly is taught that makes it possible to facilitate the construction and the maintenance of conventional support roller assemblies in an economical manner. In a preferred embodiment, mounting and replacement of a bearing assembly may be performed in a relatively simple way and therefore quickly and cost-effectively. The recyclability of the support roller bearing is thus made possible and/or improved.

SUMMARY

In another aspect of the present teachings, a bearing assembly comprises a mounting element, which carries or supports a bearing inner ring and allows the displacement of the bearing inner ring in an axial direction for the purpose of mounting the bearing assembly.

The mounting element preferably has a cylindrical outer surface. Further, the mounting element can be formed as a tubular body.

A snap ring can be disposed in an axial end portion of the bearing inner ring, which snap ring having a radially inward-lying support surface can slide in the axial direction on the outer surface of the mounting element.

Furthermore, a sealing element can be disposed in at least one axial end portion of the bearing inner ring, which sealing element is disposed so as to be displaceable in the axial direction on the mounting element together with the bearing inner ring.

Further, the bearing can be radially surrounded by a support body, wherein the support body in its radial outer portion abuts on the support roller shell. A cushioning layer is preferably disposed between the radially outer surface of the support body and the inner cylindrical surface of the support roller shell. The cushioning layer can be surrounded by a sleeve, which is insertable into the inner cylindrical surface of the support roller shell. This sleeve can have a radially-outward extending flange-like widening on an axial end; this widening is preferably formed for abutting on an axial end of the support roller shell.

Preferably, it is provided that, in the mounted state, the sleeve sits in the support roller shell with a press fit.

The bearing assembly can further include a cover, which is connected with the support body or with the cushioning layer so that they rotate together. The cover in its radially-inward-lying end portion can be disposed in a slot formed in a groove-like manner, which slot is formed in a sealing element. The sealing element can be disposed so as to be axially displaceable on the mounting element together with the bearing inner ring.

The cover can be radially enclosed by an axially projecting segment of the cushioning layer.

The cushioning layer is preferably comprised of elastomeric material, in particular polyurethane. It can also be comprised of rubber material. In particular, nitrile rubber (NBR) with a Shore hardness of at least 40 has proved itself as a rubber material. The support body and the sleeve, however, are in most cases comprised of metal, in particular of steel.

The bearing is in most cases a roller bearing.

The support roller shell can be formed as a pipe of constant wall thickness, which is borne by a bearing in each respective axial end portion.

It is particularly advantageous for the assembly, if it is further provided, that the mentioned components of the bearing assembly are formed as a structural unit, which is disposed in an axially displaceable manner on the mounting element.

In another aspect of the present teachings, the entire bearing assembly is disposed on the mounting element and the mounting process takes place by axially displacing or sliding the mounting element into the support roller shell. All of the components and/or constituent parts of the bearing assembly are preferably combined in a single structural unit and/or are connected in such a manner. The bearing assembly, including a bearing, sealing elements, a cover and/or a securing element (snap ring), can be thus mounted as a unit by displacing the mounting element, which facilitates a significantly faster mounting of the bearing assembly.

BRIEF DESCRIPTION OF THE DRAWINGS

An exemplary embodiment is illustrated in the drawing. The sole FIGURE shows a bearing assembly on a mounting element in the radial cross-section, which bearing assembly should be mounted onto a shaft and/or into a support roller shell.

DETAILED DESCRIPTION OF THE INVENTION

A bearing assembly 1 can be seen in the FIGURE, which serves to bear a support roller of a conveyer apparatus. The support roller has a support roller shell 2 with an inner cylindrical surface 3, into which the bearing assembly 1 is to be mounted by being inserted in the axial direction a. In the radially-inner portion, the bearing assembly 1 is mounted on a shaft 20, which is indicated with dashed lines in the FIGURE.

In the lower half of the FIGURE, the state shortly after the beginning of the mounting process of the bearing assembly 1 can be seen; here, the bearing assembly 1 has just been inserted a small amount into the support roller shell 2. In the upper half of the FIGURE, the completely mounted state of the bearing assembly 1 in the support roller shell 2 can be seen.

The bearing assembly 1 is comprised of a bearing 4, which is formed here as a deep groove ball bearing. The bearing 4 has a bearing inner ring 5. Sealing elements 10 and 11 are located on both sides of the bearing 4, which sealing elements 10 and 11 develop a sealing effect relative to adjacent components by the formation of a corresponding slot. The sealing element 10 is embodied as a labyrinth seal, i.e. it has two cooperating components, which form a number of slots that extend in a meandering manner and thus generate the sealing effect.

The outer ring of the bearing 4, together with the sealing elements 10, 11, sits in a cylindrical seating surface of a support body 12. The support body 12 includes a cushioning layer 13 made of elastomeric material in its radially-outer portion, which cushioning layer 13 is, in turn, enclosed by a thin sleeve 14. The sleeve 14 has a flange-like widening 15 on an axial end, which widening 15 functions as an axial stop for abutment on the support roller shell 2 (see the upper half of the FIGURE).

Further, a cover 16 is provided that is connected with the cushioning layer 13. For this purpose, the cushioning layer 13 has an axially projecting segment 19, which encompasses the radially-outer portion of the cover 16 from the outside and thus not only mechanically retains it but also seals it. The radially-inner end portion of the cover 16 extends in a slot 17 formed in a groove-like manner, which slot 17 is formed in a sealing element 18 that is disposed axially adjacent to the sealing element 10.

A snap ring 8 is also provided for axially securing the bearing assembly 1 in the mounted state, which snap ring 8 sits directly adjacent to the (left) terminal side of the bearing inner ring 5. The shaft 20 has—which is not illustrated—a corresponding groove, into which the snap ring 8 can snap when the bearing ring 1 is located in the correct axial position relative to the shaft 20.

It is important that the bearing assembly 1 comprises a mounting element 6 in the form of a pipe, i.e. a mounting pipe, which, in any case, carries the bearing inner ring 5 and allows the displacement of the bearing inner ring 5 in an axial direction a for the purpose of mounting the bearing assembly. In addition, the further components 8, 10, 11 and 18 are retained by the mounting element 6 at respective radially-inward-lying cylindrical seating surfaces (here, the snap ring 8 has a radially-inward-lying support surface 9); they are all retained in an axially displaceable manner. For this purpose, the mounting element 6 has a cylindrical outer surface 7, which can be of a suitable outer surface quality, in order to facilitate an easy displacement of the entire bearing assembly 1 with all the above-mentioned components in the axial direction a for the purpose of the mounting.

A further advantageous aspect of the described solution is that during displacement of the bearing assembly 1 of the mounting element 6 in the axial direction to the right, all components of the bearing assembly, i.e. the components 4, 8, 10, 11, 12, 13, 14, 16 and 18, form a structural unit, which are manipulated as a whole and can be mounted by a displacement process of the mounting element 6. It should be noted in this regard that the above-mentioned components 4, 8, 19, 11, 12, 13, 14, 16 and 18 do not all have to be present at the same time; a structural unit is already present in the exemplified sense when, in addition to the bearing 4, at least one other of the above-mentioned components is present.

The support roller shell 2 is formed as a hollow cylindrical component, i.e. as a pipe, wherein a bearing assembly 1 is disposed in each of the two axial end portions, as can be seen in FIG. 1. The elastomeric and/or rubber material of the cushioning layer 13 can be directly connected with the sleeve 14 and/or with the support body 12 by an injection moulding process or by a vulcanization process.

| | |
|---|---|
| 1. | bearing assembly |
| 2. | support roller shell |
| 3. | inner cylindrical surface |
| 4. | bearing (roller bearing) |
| 5. | bearing inner ring |
| 6. | mounting element |
| 7. | cylindrical outer surface |
| 8. | snap ring |
| 9. | radially inward-lying outer surface |
| 10. | sealing element |
| 11. | sealing element |
| 12. | support body |
| 13. | cushioning layer |
| 14. | sleeve |
| 15. | flange-like widening |
| 16. | cover |
| 17. | slot formed in groove-like manner |
| 18. | sealing element |
| 19. | axially projecting segment |
| 20. | shaft |
| a | axial direction |

The invention claimed is:

1. A bearing assembly for a support roller having a support roller shell, which is formed hollow cylindrically at least in one segment thereof, the bearing assembly comprising:
   at least one bearing configured to rotatably support the support roller shell, the bearing having an inner ring,
   a mounting element carrying the inner ring and allowing a displacement of the bearing inner ring in an axial direction for mounting the bearing assembly,
   a support body radially surrounding the bearing,
   a cushioning layer disposed around a radially-outer portion of the support body, and
   a sleeve surrounding the cushioning layer and being slidable along an inner cylindrical surface of the support roller shell.

2. A bearing assembly according to claim 1, wherein the mounting element has a cylindrical outer surface.

3. A bearing assembly according to claim 2, wherein the mounting element is formed as a tubular body.

4. A bearing assembly according to claim 3, further comprising:
   a snap ring disposed at an axial end portion of the bearing inner ring, the snap ring having a radially-inward support surface arranged to axially slide on the outer surface of the mounting element.

5. A bearing assembly according to claim 4, further comprising:
   a first sealing element disposed at at least one axial end portion of the bearing inner ring so as to be axially displaceable together with the bearing inner ring via the mounting element.

6. A bearing assembly according to claim 5, wherein one axial end of the sleeve has a radially-outward extending flange-shaped widening.

7. A bearing assembly according to claim 6, wherein the radially-outward extending flange-shaped widening is configured to abut on an axial end of the support roller shell.

8. A bearing assembly according to claim 7, wherein the sleeve is configured to be press-fit in the support roller shell in its mounted state.

9. A bearing assembly according to claim 8, further comprising:
   a cover connected with at least one of the support body and the cushioning layer so that they rotate together.

10. A bearing assembly according to claim 9, wherein a radially-inner end portion of the cover is disposed in a groove-shaped slot formed in a second sealing element disposed on the mounting element.

11. A bearing assembly according to claim 10, wherein the first and second sealing elements and the bearing inner ring are disposed on the mounting element so as to be axially displaceable together as a single structural unit.

12. A bearing assembly according to claim 11, wherein the cover is radially enclosed by an axially-projecting segment of the cushioning layer.

13. A bearing assembly according to claim 12, wherein the cushioning layer is comprised of at least one of an elastomer, a polyurethane and a rubber material.

14. A bearing assembly according to claim 13, the support body and the sleeve are comprised of steel, the bearing is a roller bearing, the support roller shell is formed as a pipe having a constant wall thickness and the pipe is rotatably supported at both axial ends by a roller bearing.

15. A bearing assembly according to claim 1, wherein the bearing, the support body, the cushioning layer and the sleeve are disposed on the mounting element so as to be axially displaceable together as a single structural unit.

16. A bearing assembly according to claim 15, wherein the cushioning layer is comprised of at least one of an elastomer, a polyurethane and a rubber material and wherein one axial end of the sleeve has a radially-outward extending flange configured to abut on an axial end of the support roller shell.

17. A bearing assembly configured to be axially mountable in a support roller as a single structural unit, the support roller having an at least partially hollow-cylindrical support roller shell and a support roller shaft disposed within the shell, the bearing assembly comprising:
   a mounting element configured to axially slide on the support roller shaft for mounting the bearing assembly in the support roller,
   a roller bearing having an inner ring fixedly supported on the mounting element,
   a support body radially surrounding the roller bearing,
   a cushioning layer radially surrounding the support body, and
   a sleeve radially surrounding the cushioning layer and being configured to slidably contact an inner cylindrical surface of the support roller shell.

18. A bearing assembly according to claim 17, wherein the mounting element has a cylindrical outer surface, one axial end of the sleeve has a radially-outward extending flange configured to abut on an axial end of the support roller shell, the cushioning layer is comprised of at least one of an elastomer, a polyurethane and a rubber material, and the support body and the sleeve comprise steel.

19. A bearing assembly according to claim 18, further comprising:
   a snap ring disposed at an axial end portion of the bearing inner ring, the snap ring having a radially-inward support surface arranged to axially slide on the outer surface of the mounting element,
   a sealing element disposed at at least one axial end portion of the bearing inner ring, and
   a cover connected with at least one of the support body and the cushioning layer so that they rotate together,
   wherein the bearing, the support body, the cushioning layer, the sleeve, the snap ring, the sealing element and the cover are disposed on the mounting element so as to be axially displaceable together as a single structural unit along the support roller shaft.

20. A support roller comprising:
an at least partially hollow-cylindrical support roller shell, a support roller shaft and
the bearing assembly of claim 18, wherein the mounting element is mounted on the support roller shaft and the sleeve is press-fit within the inner cylindrical surface of the support roller shell.

* * * * *